United States Patent
Chiu (10) Patent No.: US 10,501,047 B2
(45) Date of Patent: Dec. 10, 2019

(54) SEAT BELT LATCH PLATE ASSEMBLY WITH TWO-SHOT NOISE DISSIPATING BUMPERS

(71) Applicant: FORD GLOBAL TECHNOLOGIES, LLC, Dearborn, MI (US)

(72) Inventor: Edwin C. Chiu, Livonia, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/950,696

(22) Filed: Apr. 11, 2018

(65) Prior Publication Data

US 2018/0370483 A1    Dec. 27, 2018

Related U.S. Application Data

(60) Provisional application No. 62/522,941, filed on Jun. 21, 2017.

(51) Int. Cl.
| | |
|---|---|
| *B60R 22/28* | (2006.01) |
| *A44B 11/25* | (2006.01) |
| *B29C 45/16* | (2006.01) |
| *B60R 13/08* | (2006.01) |
| *B29L 31/30* | (2006.01) |
| *B29K 85/00* | (2006.01) |
| *B29K 23/00* | (2006.01) |
| *B29K 21/00* | (2006.01) |
| *B60R 22/18* | (2006.01) |

(52) U.S. Cl.
CPC .......... *B60R 22/28* (2013.01); *A44B 11/2561* (2013.01); *B29C 45/1676* (2013.01); *B29K 2021/006* (2013.01); *B29K 2023/12* (2013.01); *B29K 2085/00* (2013.01); *B29L 2031/3005* (2013.01); *B60R 13/08* (2013.01); *B60R 2022/1806* (2013.01); *Y10T 24/4028* (2015.01)

(58) Field of Classification Search
CPC ......... B60R 22/24; B60R 22/28; B60R 13/08; B60R 2022/1806; Y10T 24/4028; A44B 11/2561; B29C 45/1676
See application file for complete search history.

(56) References Cited

U.S. PATENT DOCUMENTS

| | | | |
|---|---|---|---|
| 6,837,519 B2 | 1/2005 | Moskalik et al. | |
| 7,716,795 B2 | 5/2010 | Versellie et al. | |
| 8,037,581 B2 | 10/2011 | Gray et al. | |
| 8,661,625 B2 | 3/2014 | Carene et al. | |

(Continued)

FOREIGN PATENT DOCUMENTS

| | | |
|---|---|---|
| JP | 4807878 B2 | 11/2011 |
| KR | 10-2013-0023847 B1 | 3/2013 |

OTHER PUBLICATIONS

English Machine Translation of JP4807878B2.
English Machine Translation of KR101304650B1.

*Primary Examiner* — Robert Sandy
*Assistant Examiner* — Michael S Lee
(74) *Attorney, Agent, or Firm* — Vichit Chea; King & Schickli, PLLC (57) ABSTRACT

A seat belt latch plate assembly includes a latch plate and a latch plate cover carried on the latch plate. That latch plate cover is made by means of a two-shot injection molding process and includes integral bumpers that are made from a soft, sound dissipating material and have an energy absorbing cross-sectional shape.

17 Claims, 7 Drawing Sheets

(56) References Cited

U.S. PATENT DOCUMENTS

| | | | |
|---|---|---|---|
| 2006/0090312 A1 | 5/2006 | Ichida et al. | |
| 2007/0039144 A1* | 2/2007 | Ichida | A44B 11/2561 24/633 |
| 2012/0240358 A1* | 9/2012 | Cox | A44B 11/2561 24/164 |
| 2012/0246894 A1* | 10/2012 | Carene | A44B 11/2561 24/604 |

* cited by examiner

SEAT BELT LATCH PLATE ASSEMBLY WITH TWO-SHOT NOISE DISSIPATING BUMPERS

This application claims the benefit of U.S. provisional patent application Ser. No. 62/522,941 filed on Jun. 21, 2017.

TECHNICAL FIELD

This document relates generally to the motor vehicle equipment field and, more particularly, to a new and improved seat belt latch plate assembly that reduces the noise that assembly would otherwise make when unlatched and resting between the side of a car seat and the B-pillar of the motor vehicle.

BACKGROUND

When the front passenger seat belt is not in use, the latch plate assembly connected to the seat belt webbing rests in a narrow area between the B-pillar trim and the side of the car seat with the latch plate parked on the exposed seat belt webbing toward the car seat. This parked location keeps the seat belt latch plate assembly in an accessible position so that the passenger may easily find and grasp it when donning the seat belt.

However, it should be appreciated that when the vehicle is traveling on a bumpy or uneven road surface with the seat belt latch plate assembly in this position, the mass of the seat belt latch plate assembly can induce significant side-to-side movement. This may cause a repetitive impact with the side of the car seat which in turn generates an unwanted noise or rattle that can annoy or dissatisfy a motor vehicle operator or other occupant.

This document relates to a new and improved seat belt latch plate assembly with integral bumpers that address and resolve this issue in an effective and efficient manner. The bumpers are an effective passive countermeasure that performs the desired function without requiring the operator to take any specific action.

Better noise reduction is ensured through the softness, thickness, number, position and shape of the bumpers which absorb and dissipate impact energy over a wide range of contact severities and angles that would otherwise result in noise generation. The integral molded-in-place bumpers have a purposeful appearance while the soft material may be color keyed to the base plastic of the latch plate cover thereby providing an overall perception of quality and design excellence.

Advantageously, the integral bumpers provide for long-term durability as they are attached to the seat belt latch plate assembly through a two-shot injection molding process. Accordingly, the bumpers will not peel or delaminate with use or age.

SUMMARY

In accordance with the purposes and benefits described herein, a new and improved seat belt latch plate assembly is provided. That seat belt latch plate assembly comprises a latch plate and a latch plate cover carried on the latch plate. The latch plate cover includes a first integral bumper made from a noise dissipating material.

The first integral bumper may have a C-shaped cross section. The first integral bumper may be hemi-ellipsoid in shape. The first integral bumper may include a first wall defining a first open channel. The first integral bumper may include a first lip and a second lip. The first wall may be tapered toward the first lip and the second lip.

The latch plate cover may be a two-shot, single piece plastic overmold on the latch plate. In one possible alternative embodiment, the latch plate cover may comprise a base section overmold on the latch plate and a two-shot, snap-on trim cover secured to the base section.

The seat belt latch plate assembly may further include a second integral bumper spaced from the first integral bumper. In such an embodiment, both of the first and second integral bumpers may be hemi-ellipsoid in shape.

The first integral bumper may include a first wall defining a first open channel. The second integral bumper may include a second wall defining a second open channel. The first wall may include a first lip and a second lip. The second wall may include a third lip and a fourth lip. The first wall may be tapered toward the first lip and the second lip. The second wall may be tapered toward the third lip and the fourth lip.

The latch plate cover may comprise a two-shot, single-piece overmold on the latch plate. That two-shot, single-piece overmold may include (a) a body section molded from a first material and (b) first and second integral bumpers molded from a second material. The first material is more rigid than the second material and the second material is softer than the first material. The first material may be selected from a first group of materials consisting of nylon (polyamide), polypropylene and combinations thereof. The second material may be selected from a second group of materials consisting of thermoplastic elastomers.

In another possible embodiment, the latch plate cover comprises a two-shot snap-on trim cover and a cooperating base section overmold on the latch plate. The two-shot, snap-on trim cover may include (a) a body section molded from a first material and (b) first and second integral bumpers molded from a second material. The first material is more rigid than the second material and the second material is softer than the first material. The first material may be selected from a first group of materials consisting of nylon (polyamide), polypropylene and combinations thereof. The second material may be selected from a second group of materials consisting of thermoplastic elastomers.

In the following description, there are shown and described several preferred embodiments of the seat belt latch plate assembly. As it should be realized, the seat belt latch plate assembly is capable of other, different embodiments and its several details are capable of modification in various, obvious aspects all without departing from the seat belt latch plate assembly as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the seat belt latch plate assembly and together with the description serve to explain certain principles thereof.

FIG. 1b is a perspective view of the latch plate of the seat belt latch plate assembly shown in FIG. 1a.

Reference will now be made in detail to the present preferred embodiments of the seat belt latch plate assembly, examples of which are illustrated in the accompanying drawing figures.

DETAILED DESCRIPTION

Reference is now made to FIGS. 1-8 illustrating the new and improved seat belt latch plate assembly 10. The seat belt latch plate assembly 10 includes a latch plate 12, made from steel, metal or other high strength material, and a latch plate cover 14, carried on the latch plate.

Figure 1A:
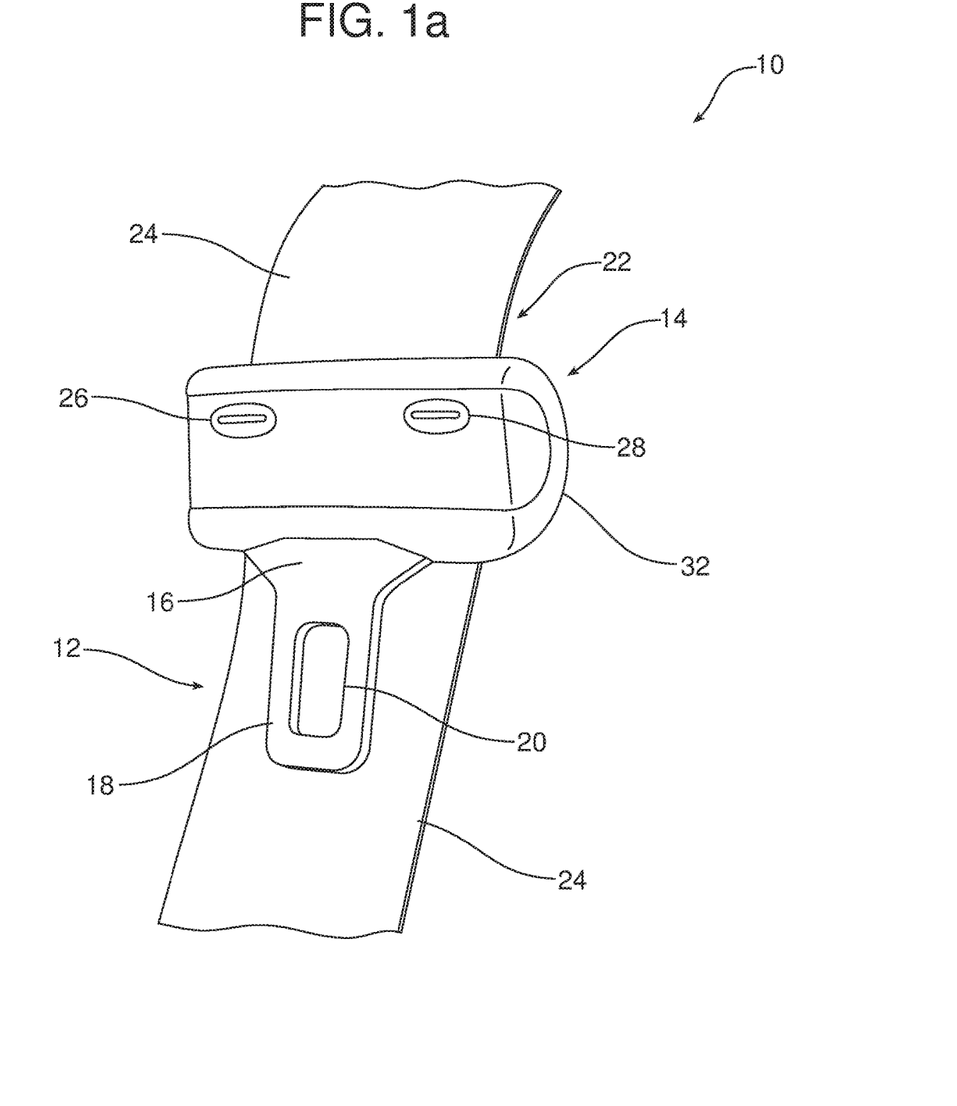
FIG. 1a is a perspective view of the new and improved seat belt latch plate assembly carried on a portion of seat belt webbing.
Figure 1B:
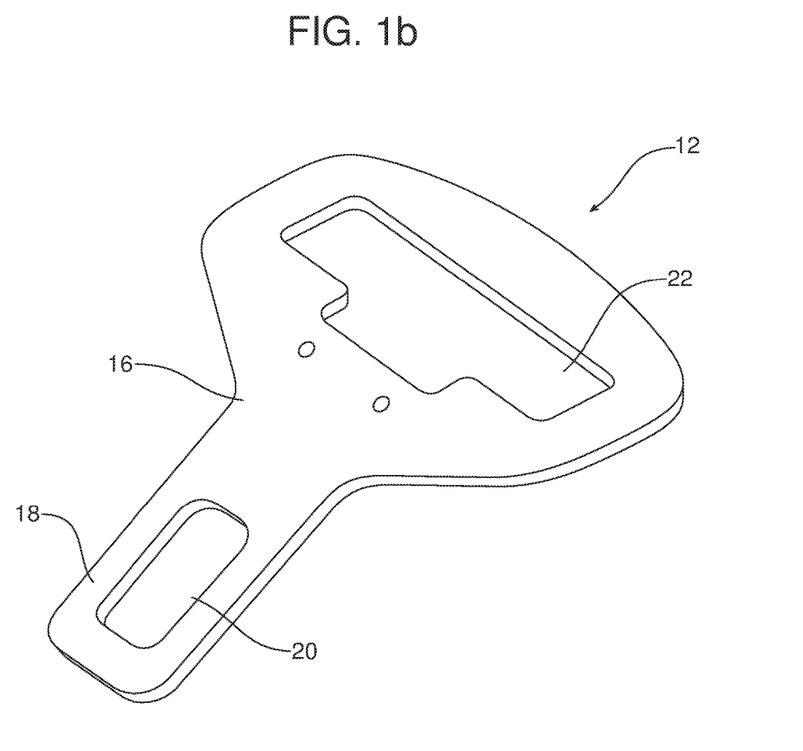

The latch plate 12 includes a tongue body 16 having a latching lug 18 with a central opening 20. As is known in the art, the latching lug 18 is received and secured in the latch member of a seat belt buckle (not shown). The tongue body 16 also includes a guide slot 22 that receives the seat belt webbing 24 upon which the latch plate assembly 10 is carried.

Figure 2:
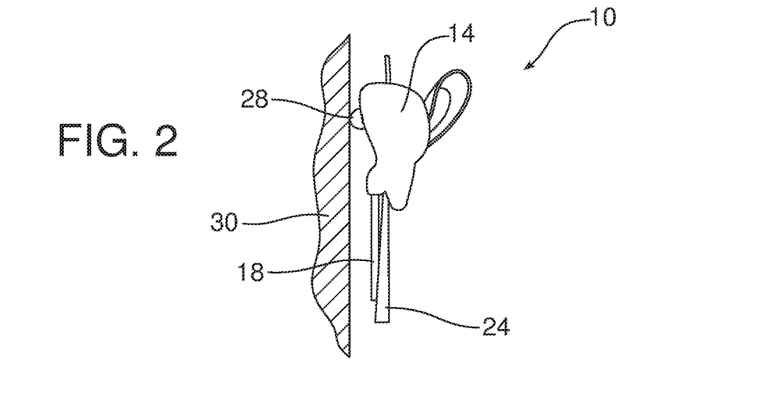
FIGS. 2 and 3 are respective detailed side and top plan views of the seat belt latch plate assembly illustrated in FIG. 1 showing how the integral bumpers on the latch plate cover functions to prevent the latch plate from engaging the side of a car seat, thereby dissipating noise that would otherwise be produced.
Figure 3:
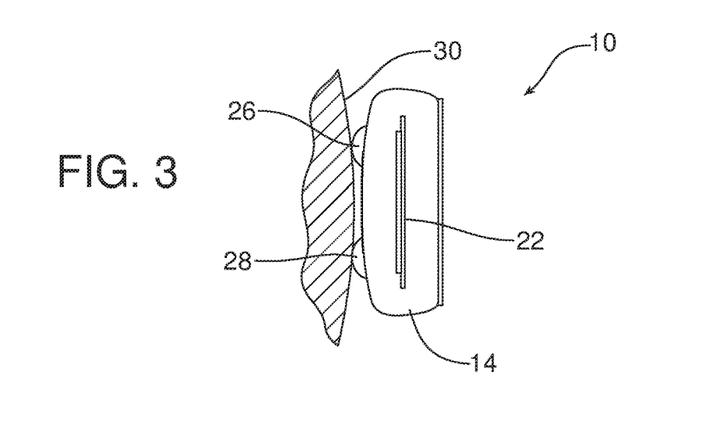
Figure 4:
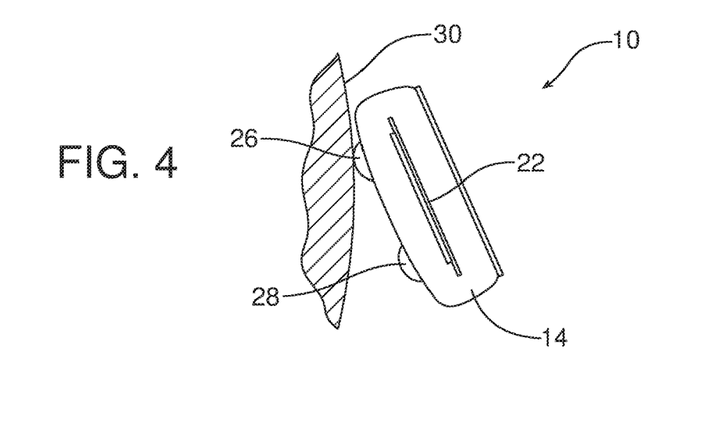
FIG. 4 is an additional top plan view showing how the spaced bumpers even function to dissipate noise when the seat belt latch plate assembly has been rotated with respect to the side of a car seat.

The latch plate cover 14 includes a first integral bumper 26 and a second integral bumper 28 spaced from the first integral bumper. The two bumpers 26, 28 are made from a material that will dissipate noise when the seat belt latch plate assembly 10 engages, for example, the side of a car seat 30 as illustrated in FIGS. 2, 3 and 4. For purposes of this document, a noise dissipating material is defined as a thermoplastic elastomer.

In the embodiment illustrated in FIGS. 1-5, the latch plate cover 14 includes a body section 32 molded from a plastic material while the first and second integral bumpers 26, 28 of the latch plate cover are molded from an elastomer material. The plastic material is more rigid than the elastomer material and the elastomer material is softer than the plastic material.

Figure 5:
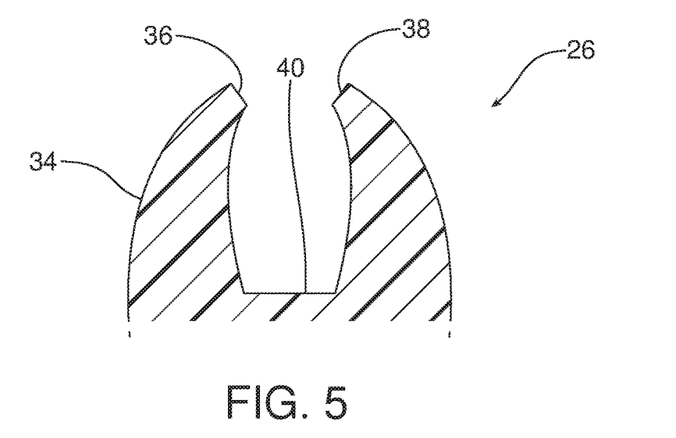
FIG. 5 is a schematic cross section view through the middle of the first bumper.
Figure 6:
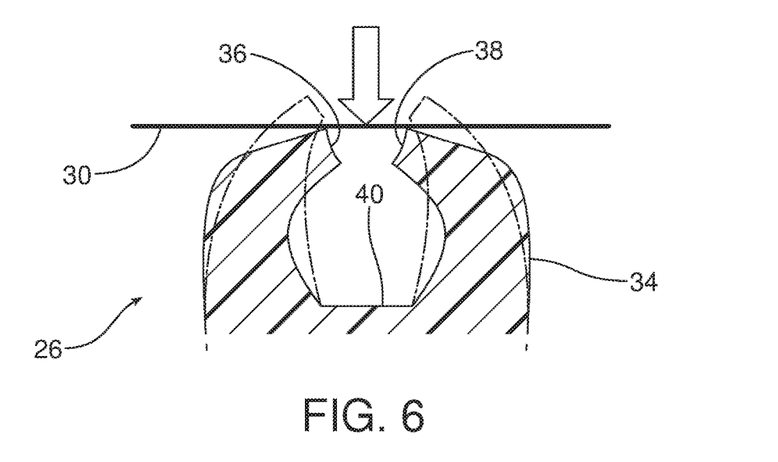
FIG. 6 is a view similar to FIG. 5 but illustrating that first bumper after initial contact against the car seat.
Figure 7:
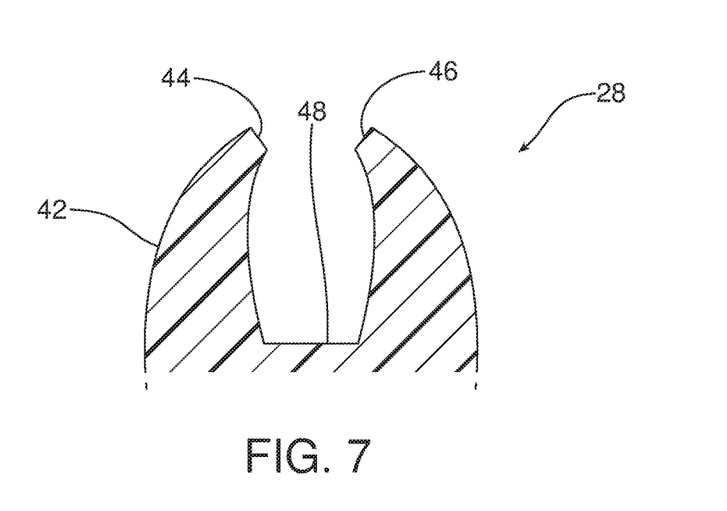
FIG. 7 is a schematic cross section view through the middle of the second bumper.
Figure 8:
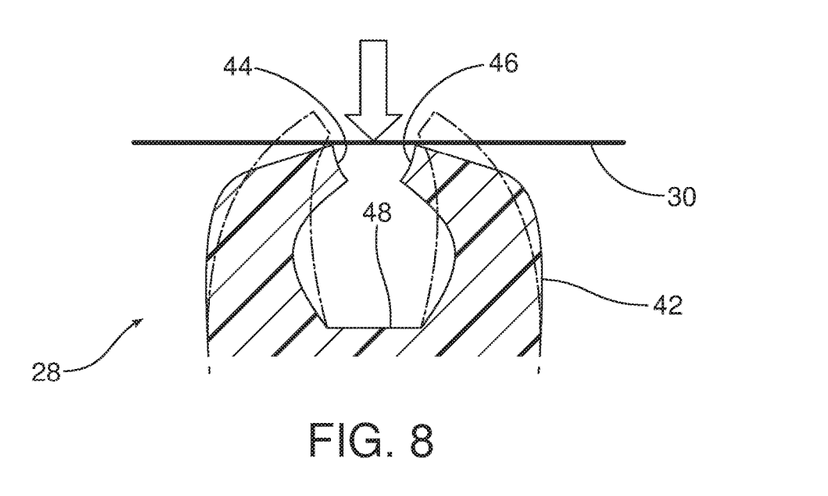
FIG. 8 is a view similar to FIG. 7 but illustrating that second bumper after initial contact against the car seat.

The bumpers 26, 28 may assume a number of different shapes. As best illustrated in FIG. 1, each of the bumpers 26, 28 may be hemi-ellipsoidal in shape. As illustrated best in FIGS. 5 and 6, the first integral bumper 26 includes a first wall 34 having a first lip 36 and a second lip 38 outlining a first open channel 40 defined by the first wall. Further, the first wall 34 tapers toward the first lip 36 and the second lip 38. Similarly, as illustrated best in FIGS. 7 and 8, the second integral bumper 28 includes a second wall 42 having a third lip 44 and a fourth lip 46 outlining a second open channel 48 defined by the second wall. Further, the second wall 42 tapers toward the third lip 44 and the fourth lip 46. As a result, the first and second integral bumpers 26, 28 each have an energy-absorbing, substantially C-shaped cross section as best illustrated in FIGS. 5 and 7.

The hollow cross-section, tapered wall thickness (thicker at the base, thinner at the lips 36, 38) and curved shape of the bumpers 26, 28 help to define the operating characteristics of the bumpers. Those bumpers 26, 28 are initially highly compliant to dissipate energy from the impact of the latch plate assembly 10 against the car seat 30. That compliance progressively decreases to slow the latch plate assembly 10 after initial contact (see FIGS. 6 and 8) and prevent other parts thereof from contacting the car seat 30.

The elastomer material from which the bumpers 26, 28 are constructed is soft enough to maintain flexibility and durable enough to resist warping or degradation in a typical vehicle environment. The elastomer material is also compatible with the plastic material so as to enable two-shot injection molding of the latch plate cover 14 by two-shot molding processes generally known in the art. In at least some embodiments, the first and second integral bumpers 26, 28 will also be color matched to the body section 32.

The body section 32 of the latch plate cover 14 may be made from a plastic material selected from a first group of materials consisting of nylon (polyamide), polypropylene and combinations thereof. The first and second bumpers 26, 28 may be made from an elastomer material selected from a second group of materials consisting of thermoplastic elastomers. Here it should be appreciated that the listed materials are merely exemplary of those that could be used and should not be considered as limiting in scope.

As should be appreciated, the size, quantity and external shape of the integral bumpers 26, 28 on the latch plate cover 14 may be varied in order to provide the desired performance and the elimination of rattles and noise when the latch plate assembly 10 is unbuckled and resting between the side of the car seat 30 and the B-pillar of the motor vehicle. The height of the bumpers 26, 28 should prevent contact of all parts of the latch plate 12 against the car seat 30 when resting unbuckled. The number and external shape of the bumpers 26, 28 may best be determined by the shape of the surface of the car seat 30 where the latch plate assembly 10 makes contact and the dimensional stability of the bumper or second material.

Figure 9:
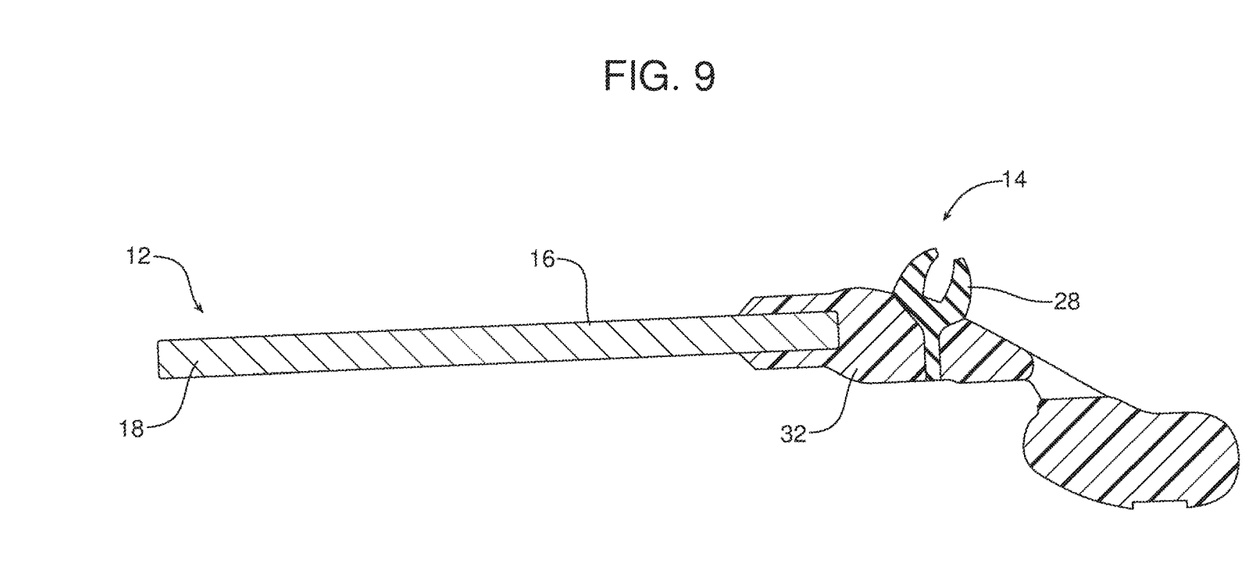
FIG. 9 is a cross-sectional view of one possible embodiment of the seat belt latch plate assembly wherein the latch plate cover is a two-shot, single-piece overmold on the latch plate.

As illustrated in FIG. 9, in one possible embodiment the latch plate cover 14 may comprise a two-shot, single-piece plastic overmold on the latch plate 12.

Figure 10:
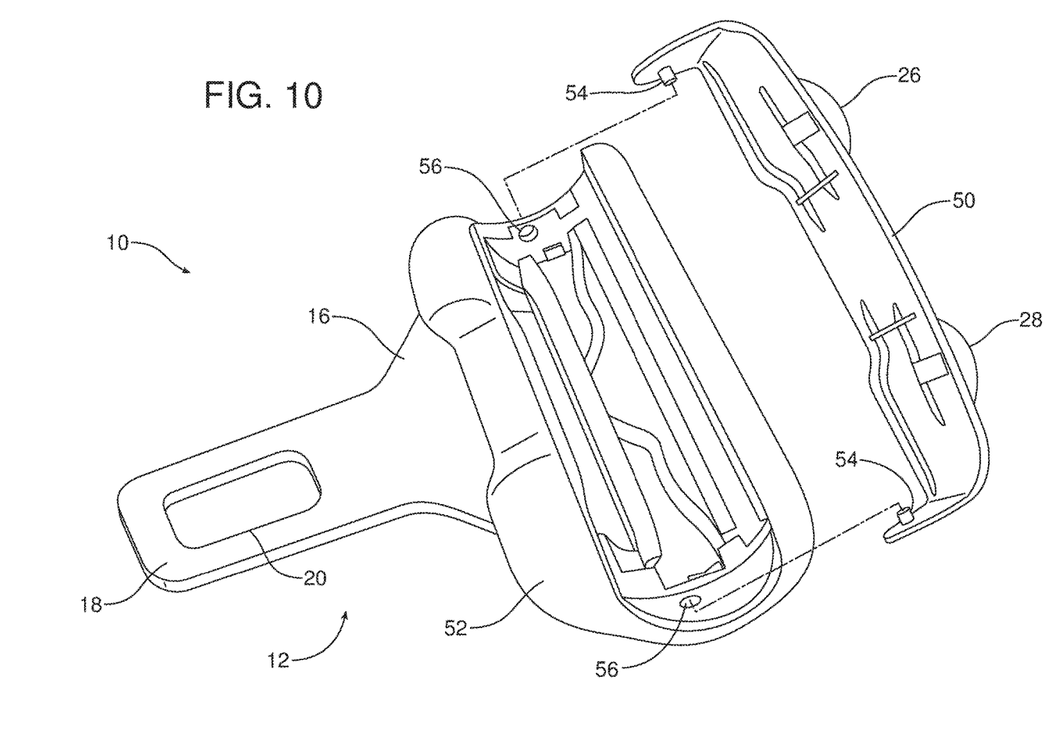
FIG. 10 is a perspective view of an alternative embodiment of the seat belt latch plate assembly wherein the latch plate cover is of two-piece construction and includes a base section overmold on the latch plate and a cooperating two-shot snap-on trim cover secured to the base section by appropriate fastening means.

As illustrated in FIG. 10, in an alternative embodiment, the latch plate cover 14 may comprise a two-shot, snap-on trim cover 50 and a cooperating base section overmold 52 on the latch plate 12. The two-shot, snap-on cover 50 may be secured to the base section overmold 52 by any appropriate fastening means such as the cooperating pins 54 on the cover and the pin receivers 56 on the base section overmold.

The foregoing has been presented for purposes of illustration and description. It is not intended to be exhaustive or to limit the embodiments to the precise form disclosed. Obvious modifications and variations are possible in light of the above teachings. For example, it should be appreciated that the latch plate cover 14 may assume other configurations. For example, one or more integral bumpers may also be provided on the opposite side or face of the latch plate cover 14 to prevent rattling against the side or pillar of the motor vehicle. All such modifications and variations are within the scope of the appended claims when interpreted in accordance with the breadth to which they are fairly, legally and equitably entitled.

What is claimed:

1. A seat belt latch plate assembly, comprising:
a latch plate; and
a latch plate cover carried on said latch plate, said latch plate cover including a first integral bumper made from a noise dissipating material wherein said first integral bumper is hemi-ellipsoid in shape and said first integral bumper includes a first wall defining a first open channel.

2. The seat belt latch plate assembly of claim 1, wherein said first integral bumper has an energy-absorbing, C-shaped cross section.

3. The seat belt latch plate assembly of claim 1, wherein said first wall includes a first lip and a second lip.

4. The seat belt latch plate assembly of claim 3, wherein said first wall is tapered toward said first lip and said second lip.

5. The seat belt latch plate assembly of claim 4, wherein said latch plate cover is a two-shot, single-piece plastic overmold on said latch plate.

6. The seat belt latch plate assembly of claim 4, wherein said latch plate cover is a two-shot, snap-on trim cover and a cooperating base section overmold on said latch plate.

7. The seat belt latch plate assembly of claim 1, further including a second integral bumper spaced from said first integral bumper.

8. The seat belt latch plate assembly of claim 7, wherein said second integral bumper is hemi-ellipsoid in shape.

9. The seat belt latch plate assembly of claim 8, wherein said second integral bumper includes a second wall defining a second open channel.

10. The seat belt latch plate assembly of claim 9, wherein said first wall includes a first lip and a second lip and said second wall includes a third lip and a fourth lip.

11. The seat belt latch plate assembly of claim 10, wherein said first wall is tapered toward said first lip and said second lip and said second wall is tapered toward said third lip and said fourth lip.

12. The seat belt latch plate assembly of claim 11, wherein said latch plate cover is a two-shot, single-piece overmold on said latch plate.

13. The seat belt latch plate assembly of claim 12, wherein said two-shot, single-piece plastic overmold includes (a) a body section molded from a first material and (b) said first integral bumper and said second integral bumper molded from a second material wherein said first material is more rigid than said second material and said second material is softer than said first material.

14. The seat belt latch plate assembly of claim 13, wherein said first material is selected from a first group of materials consisting of nylon (polyamide), polypropylene and combinations thereof and said second material is selected from a second group of materials consisting of thermoplastic elastomers.

15. The seat belt latch plate assembly of claim 10, wherein said latch plate cover is a two-shot, snap-on trim cover and a cooperating base section overmold on said latch plate.

16. The seat belt latch plate assembly of claim 15, wherein said two-shot, snap-on trim cover includes (a) a body section molded from a first material and (b) said first integral bumper and said second integral bumper molded from a second material wherein said first material is more rigid than said second material and said second material is softer than said first material.

17. The seat belt latch plate assembly of claim 16, wherein said first material is selected from a first group of materials consisting of nylon (polyamide), polypropylene and combinations thereof and said second material is selected from a second group of materials consisting of thermoplastic elastomers and combinations thereof.

* * * * *